US010281636B2

(12) United States Patent
Motooka et al.

(10) Patent No.: US 10,281,636 B2
(45) Date of Patent: *May 7, 2019

(54) BACK LIGHT

(71) Applicant: Japan Display Inc., Tokyo (JP)

(72) Inventors: Munenori Motooka, Mobara (JP); Nobuyuki Suzuki, Isumi (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,041

(22) Filed: Aug. 2, 2018

(65) Prior Publication Data

US 2018/0364407 A1    Dec. 20, 2018

Related U.S. Application Data

(63) Continuation of application No. 15/725,602, filed on Oct. 5, 2017, now Pat. No. 10,067,282, which is a (Continued)

(30) Foreign Application Priority Data

Aug. 15, 2011  (JP) ................................. 2011-177436

(51) Int. Cl.
*F21V 7/04*       (2006.01)
*F21V 8/00*       (2006.01)
*G02F 1/1335*   (2006.01)

(52) U.S. Cl.
CPC ......... *G02B 6/0023* (2013.01); *G02B 6/0013* (2013.01); *G02B 6/0051* (2013.01); (Continued)

(58) Field of Classification Search
CPC .... G02B 6/0023; G02B 6/0055; G02B 6/005; G02B 6/0051; G02B 6/0085; (Continued)

(56) References Cited

U.S. PATENT DOCUMENTS 5,838,412 A * 11/1998 Ueda .................... G02B 6/0088
349/150
8,864,361 B2   10/2014 Motooka et al.
(Continued)

FOREIGN PATENT DOCUMENTS

JP    10-161119 A     6/1998
JP    2004-071167 A   3/2004
(Continued)

*Primary Examiner* — Ali Alavi
(74) *Attorney, Agent, or Firm* — Typha IP LLC

(57) ABSTRACT

A backlight unit includes a light source having an emission region, a wiring board having the light source mounted thereon, a light guide plate having a side surface into which light from the light source enters, and a front surface from which the light exits, a light shielding adhesive tape adhering to the wiring board, and an optical sheet which overlaps with the front surface of the light guide plate. The front surface of the light guide plate includes an effective region serving as a planar light source and a light entering region ranging from the side surface to the effective region. The wiring board and the light-shielding adhesive tape each have a part positioned in the light entering region, and the optical sheet is arranged from the effective region to the light entering region. An end portion of the optical sheet overlaps with the light-shielding tape.

10 Claims, 5 Drawing Sheets

Related U.S. Application Data continuation of application No. 15/392,019, filed on Dec. 28, 2016, now Pat. No. 9,810,827, which is a continuation of application No. 14/499,509, filed on Sep. 29, 2014, now Pat. No. 9,568,667, which is a continuation of application No. 13/572,757, filed on Aug. 13, 2012, now Pat. No. 8,864,361.

(52) U.S. Cl.
CPC ......... *G02B 6/0053* (2013.01); *G02B 6/0055* (2013.01); *G02B 6/0083* (2013.01); *G02B 6/0088* (2013.01); *G02F 1/133615* (2013.01); *G02F 2001/133612* (2013.01)

(58) Field of Classification Search
CPC .. G02B 6/0083; G02B 6/0013; G02B 6/0053; G02F 1/133615; G02F 2001/133612
See application file for complete search history.

(56) References Cited

U.S. PATENT DOCUMENTS

| | | | |
|---|---|---|---|
| 9,239,421 B2 | 1/2016 | Minoura | |
| 9,477,030 B2 | 10/2016 | Chong et al. | |
| 9,568,667 B2 | 2/2017 | Motooka et al. | |
| 9,810,827 B2 | 11/2017 | Motooka et al. | |
| 2006/0171170 A1* | 8/2006 | Lee | G02B 6/0088 362/632 |
| 2008/0180972 A1 | 7/2008 | Sakamoto et al. | |
| 2009/0009682 A1* | 1/2009 | Chung | G02B 6/0083 349/58 |
| 2009/0284688 A1 | 11/2009 | Shiraishi et al. | |
| 2010/0085512 A1 | 4/2010 | Ueda et al. | |
| 2010/0182529 A1 | 7/2010 | Nakanishi | |
| 2014/0369038 A1 | 12/2014 | Tischler et al. | |
| 2015/0124197 A1* | 5/2015 | Yeom | G02B 6/0091 349/65 |
| 2016/0377799 A1* | 12/2016 | Park | G02B 6/0085 349/65 |

FOREIGN PATENT DOCUMENTS

| | | |
|---|---|---|
| JP | 2009-080947 A | 4/2009 |
| JP | 2009-276531 A | 11/2009 |
| JP | 2010-169850 A | 8/2010 |
| WO | 2004/076917 A1 | 9/2004 |

* cited by examiner

BACK LIGHT

CROSS-REFERENCE TO RELATED APPLICATIONS

This application is a continuation of U.S. application Ser. No. 15/725,602, filed on Oct. 5, 2017, which, in turn, is a continuation of U.S. application Ser. No. 15/392,019 (now U.S. Pat. No. 9,810,827) filed on Dec. 28, 2016, which, in turn, is a continuation of U.S. application Ser. No. 14/499,509 (now U.S. Pat. No. 9,568,667) filed on Sep. 29, 2014, which, in turn, is a continuation of U.S. application Ser. No. 13/572,757 (now U.S. Pat. No. 8,864,361) filed on Aug. 13, 2012, the contents of which are incorporated herein by reference.

Further, this application claims priority from Japanese application JP 2011-177436 filed on Aug. 15, 2011, the contents of which are hereby incorporated by reference into this application.

BACKGROUND OF THE INVENTION

1. Field of the Invention

The present invention relates to a display device.

2. Description of the Related Art

In a display device including a side-light type backlight unit, light entering an end surface of a light guide plate travels inside the light guide plate and exits from a front surface of the light guide plate (Japanese Patent Application Laid-open No. 2009-276531). As a light source of the backlight unit, a light emitting diode (LED) is generally used. The LED is mounted on a flexible wiring board and is arranged so as to face the end surface of the light guide plate. Further, an optical sheet is arranged on the front surface of the light guide plate.

When the flexible wiring board is fixed to an end portion of the front surface of the light guide plate with a light-shielding double-sided tape, on the front surface side of the light guide plate, there is formed a gap from which the light guide plate is exposed between the light-shielding double-sided tape and the optical sheet. Light exiting from the gap does not pass through the optical sheet and enters a display panel from an end surface thereof. Therefore, when the display panel is obliquely viewed, the light of the LED may be directly observed, which causes a problem of display quality degradation.

SUMMARY OF THE INVENTION

The present invention has an object to provide a display device which is capable of blocking leakage light from a light guide plate to prevent quality degradation.

(1) According to an exemplary embodiment of the present invention, there is provided a display device, including: a display panel; and a backlight unit to be used as a planar light source of the display panel. The backlight unit includes: a light source having an emission region narrower than an emission region of the planar light source; a wiring board having the light source mounted thereon; a light guide plate having an end surface into which light from the light source enters, and a front surface from which the light exits; a light-shielding pressure-sensitive adhesive sheet for causing the wiring board to adhere to an end portion of the front surface of the light guide plate; and a light diffusion sheet which overlaps with the front surface of the light guide plate. The front surface of the light guide plate includes an effective region serving as the planar light source and a light entering region ranging from the end surface into which the light enters to the effective region. The wiring board and the light-shielding pressure-sensitive adhesive sheet each have a part positioned in the light entering region. The light diffusion sheet is arranged from the effective region to the light entering region, and at least an end portion thereof overlaps with the light-shielding pressure-sensitive adhesive sheet in the light entering region. On a side closer to the effective region with respect to the light-shielding pressure-sensitive adhesive sheet, the light entering region is covered with the light diffusion sheet without a gap. According to the exemplary embodiment of the present invention, the light diffusion sheet and the light-shielding pressure-sensitive adhesive sheet are provided in an overlapping manner without a gap. Therefore, the leakage light from the light guide plate can be blocked to prevent quality degradation.

(2) In the display device as described in Item (1), at least a part of the light-shielding pressure-sensitive adhesive sheet may be interposed between the wiring board and the light guide plate.

(3) In the display device as described in Item (1), the light-shielding pressure-sensitive adhesive sheet may adhere from a surface of the wiring board directed to a side opposite to the light guide plate to the front surface of the light guide plate.

(4) In the display device as described in Item (2) or (3), the light-shielding pressure-sensitive adhesive sheet may include an overlapping portion with the wiring board, the light-shielding pressure-sensitive adhesive sheet extending off from the overlapping portion in a direction of the effective region, and overlapping with the light diffusion sheet outside the wiring board.

(5) In the display device as described in Item (4), the light-shielding pressure-sensitive adhesive sheet may overlap with the light diffusion sheet arranged on the light guide plate.

(6) In the display device as described in Item (4), the light diffusion sheet may overlap with the light-shielding pressure-sensitive adhesive sheet arranged on the light guide plate.

(7) In the display device as described in any one of Items (4) to (6), the light diffusion sheet may include a non-overlapping portion at which overlapping with the light-shielding pressure-sensitive adhesive sheet is avoided, and the display device may further include a light-shielding film which is formed so as to cross a boundary between the overlapping portion and the non-overlapping portion.

(8) In the display device as described in Item (2), the light diffusion sheet may be arranged so as to reach a surface of the wiring board directed on a side opposite to the light guide plate, and the light diffusion sheet may overlap with the light-shielding pressure-sensitive adhesive sheet through an intermediation of the wiring board.

DETAILED DESCRIPTION OF THE INVENTION

Hereinafter, an embodiment of the present invention is described with reference to the drawings.

Figure 1:
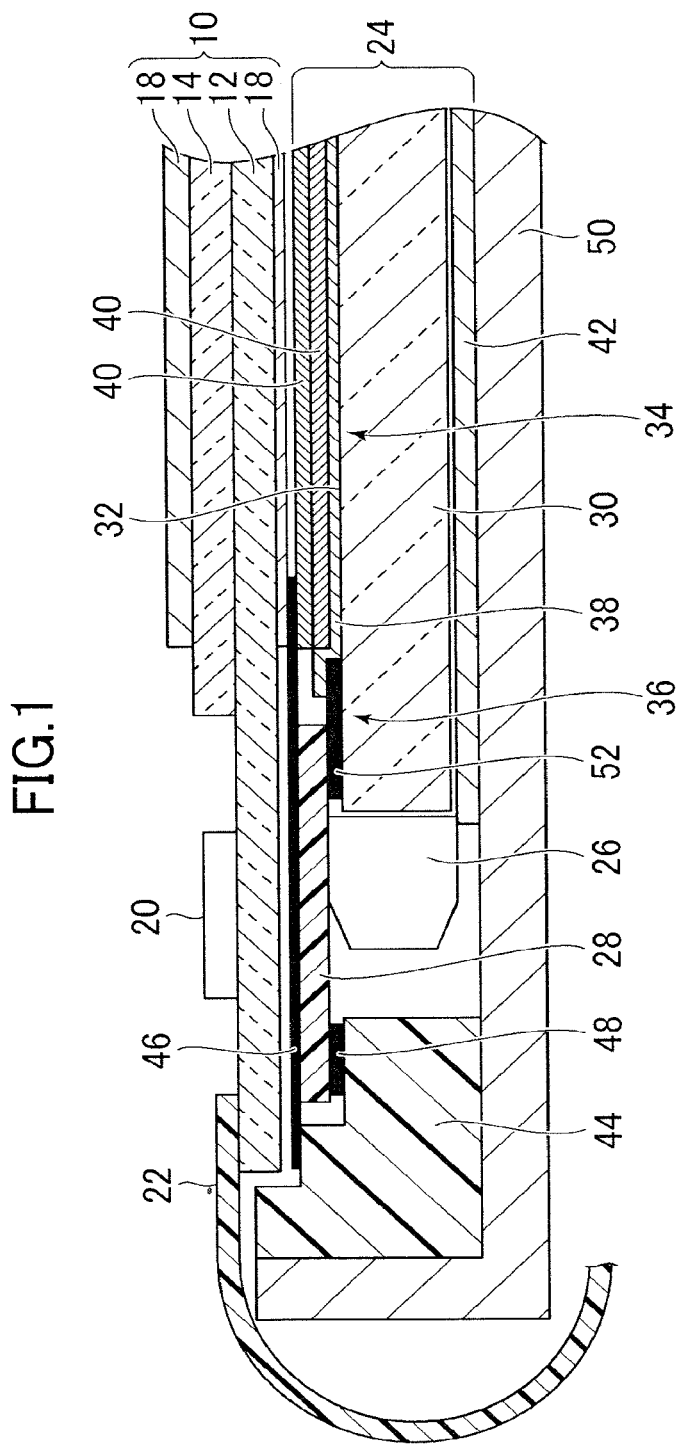
FIG. 1 is a sectional view illustrating a display device according to an embodiment to which the present invention is applied.

FIG. 1 is a sectional view illustrating a display device according to an embodiment to which the present invention is applied. The display device includes a display panel 10. The display panel 10 is a light-shutter type display panel which controls passing and blocking of light to display an image. The display panel 10 illustrated in FIG. 1 is a liquid crystal display panel, and includes a pair of substrates 12 and 14 made of glass and the like, liquid crystal (not shown) sandwiched between the substrates, and polarizing plates 18 arranged on outer sides of the pair of substrates 12 and 14, respectively.

One substrate (lower substrate in FIG. 1) 12 extends off from another substrate (upper substrate in FIG. 1) 14. On a surface of the one substrate 12 on a side opposed to the another substrate 14 in a part which extends off from the another substrate 14, there is mounted an integrated circuit chip 20 having a driver circuit embedded therein, for driving the liquid crystal. Further, a flexible wiring board 22 is fixed to the part on which the integrated circuit chip 20 is mounted.

The display device includes a backlight unit 24 which is used as a planar light source of the display panel 10. The backlight unit 24 includes a light source 26. The light source 26 is a point light source such as a light emitting diode (LED). The point light source has a narrower emission region than that of the planar light source. The light source 26 emits white light.

The light source 26 is mounted on a wiring board 28 such as a flexible printed circuit (FPC) board, and is electrically connected to a wiring pattern (not shown) on the wiring board 28. The wiring board 28 is arranged so that the light source 26 is directed downward (to a side opposite to the display panel 10). The wiring board 28 includes a part which overlaps with the light source 26 and a part outside a region on which the light source 26 is mounted. The wiring board 28 is arranged so as to overlap with at least an end portion of the display panel 10. Further, the wiring board 28 is arranged so as to overlap with the integrated circuit chip 20. The wiring board 28 is opaque, but does not have a light-shielding property and transmits light.

The backlight unit 24 includes a light guide plate 30. The light guide plate 30 is provided for converting the light of the light source 26 (point light source) into a planar light source to illuminate the display panel 10 with the planar light source. The light from the light source 26 enters an end surface of the light guide plate 30. For the entrance of the light from the light source 26, the end portion of the light guide plate 30 is arranged adjacent to the light source 26. The wiring board 28 is positioned on the light source 26, and an end portion of the wiring board 28 overlaps with the light guide plate 30. The light source 26 and the light guide plate 30 may be provided in contact with each other, or a gap may be provided therebetween. Light exits in a planar shape from a front surface 32 of the light guide plate 30. The front surface 32 of the light guide plate 30, which performs planar emission, is opposed to the display panel 10. The front surface 32 of the light guide plate 30 includes an effective region 34 as the planar light source, and a light entering region 36 ranging from the end surface, into which light enters, to the effective region 34.

The backlight unit 24 includes a light diffusion sheet 38 which overlaps with the front surface 32 of the light guide plate 30. The light diffusion sheet 38 is arranged on the light guide plate 30 (on a side closer to the display panel 10). The light diffusion sheet 38 is arranged in a range from the effective region 34 to the light entering region 36 of the light guide plate 30. The light diffusion sheet 38 has a weak light diffusion action, and hence influence on light distribution can be weakened when light passes through the light diffusion sheet 38. On the light diffusion sheet 38 (on a side closer to the display panel 10), a plurality of prism sheets 40 are arranged. When light passes through the prism sheets 40, light is collected to the front side to increase the front brightness. The light diffusion sheet 38 and the prism sheets 40 are collectively called an optical sheet. Further, below the light guide plate 30 (on a side opposite to the display panel 10), a reflective sheet 42 is arranged.

The display device includes an inner frame 44, and the backlight unit 24 is arranged inside the inner frame 44. The inner frame 44 is a resin molded product, and is also called a mold. The inner frame 44 supports the display panel 10. The display panel 10 is adhered to the inner frame 44 by a double-sided tape 46. In the example illustrated in FIG. 1, a lower surface of a left end portion of the double-sided tape 46 is adhered to the inner frame 44, and an upper surface of a right end portion of the double-sided tape 46 is adhered to the polarizing plate 18 of the display panel 10. The double-sided tape 46 has a light-shielding property. The double-sided tape 46 covers the wiring board 28 having the light source 26 mounted thereon, and extends off from the wiring board 28. Therefore, with the double-sided tape 46, light emitted from the light source 26 to pass through the wiring board 28 and light leaked from a periphery of the wiring board 28 are blocked. Note that, the double-sided tape 46 is also adhered to the wiring board 28 and the prism sheet 40.

The inner frame 44 surrounds and holds the light guide plate 30 and the light source 26. The wiring board 28 having the light source 26 mounted thereon is adhered to the inner frame 44 with a double-sided tape 48. Specifically, the wiring board 28 extends in mutual opposite directions from the region on which the light source 26 is mounted, and one end portion thereof is adhered to the inner frame 44 in an overlapped manner. The double-sided tape 48 is interposed between the wiring board 28 and the inner frame 44. The double-sided tape 48 has a light-shielding property. The inner frame 44, the backlight unit 24, and the display panel 10 are housed in an outer frame 50.

The backlight unit 24 includes a light-shielding pressure-sensitive adhesive sheet 52. The light-shielding pressure-sensitive adhesive sheet 52 includes a light-shielding layer and a pressure-sensitive adhesive layer (both not shown). When the light-shielding layer is black, the light-shielding layer can absorb light to reduce light reflection. The pressure-sensitive adhesive layer is formed on both surfaces of the light-shielding layer. When the pressure-sensitive adhesive layer is an insulating member, the light-shielding layer may be a conductor. Further, the double-sided tape 48 and the light-shielding pressure-sensitive adhesive sheet 52 may be integrated with each other.

The light-shielding pressure-sensitive adhesive sheet 52 causes the wiring board 28 to adhere to an end portion of the front surface 32 of the light guide plate 30. The wiring board 28 and the light-shielding pressure-sensitive adhesive sheet 52 each have a part positioned in the light entering region 36 of the light guide plate 30. At least a part of the light-shielding pressure-sensitive adhesive sheet 52 is interposed between the wiring board 28 and the light guide plate 30. The light-shielding pressure-sensitive adhesive sheet 52 includes an overlapping portion with respect to the wiring board 28, and extends off from the overlapping portion in a direction of the effective region 34. In the light entering region 36 of the light guide plate 30, the light-shielding pressure-sensitive adhesive sheet 52 overlaps with the light diffusion sheet 38 outside the wiring board 28. In the light entering region 36, at least an end portion of the light diffusion sheet 38 overlaps with the light-shielding pressure-sensitive adhesive sheet 52. On a side closer to the effective region 34 with respect to the light-shielding pressure-sensitive adhesive sheet 52, the light entering region 36 is covered with the light diffusion sheet 38 without a gap. The light diffusion sheet 38 overlaps with the light-shielding pressure-sensitive adhesive sheet 52 arranged on the light guide plate 30.

According to this embodiment, the light diffusion sheet 38 overlaps with the light-shielding pressure-sensitive adhesive sheet 52 without a gap, and hence it is possible to block the leakage light from the light guide plate 30 to prevent quality degradation.

Figure 2:
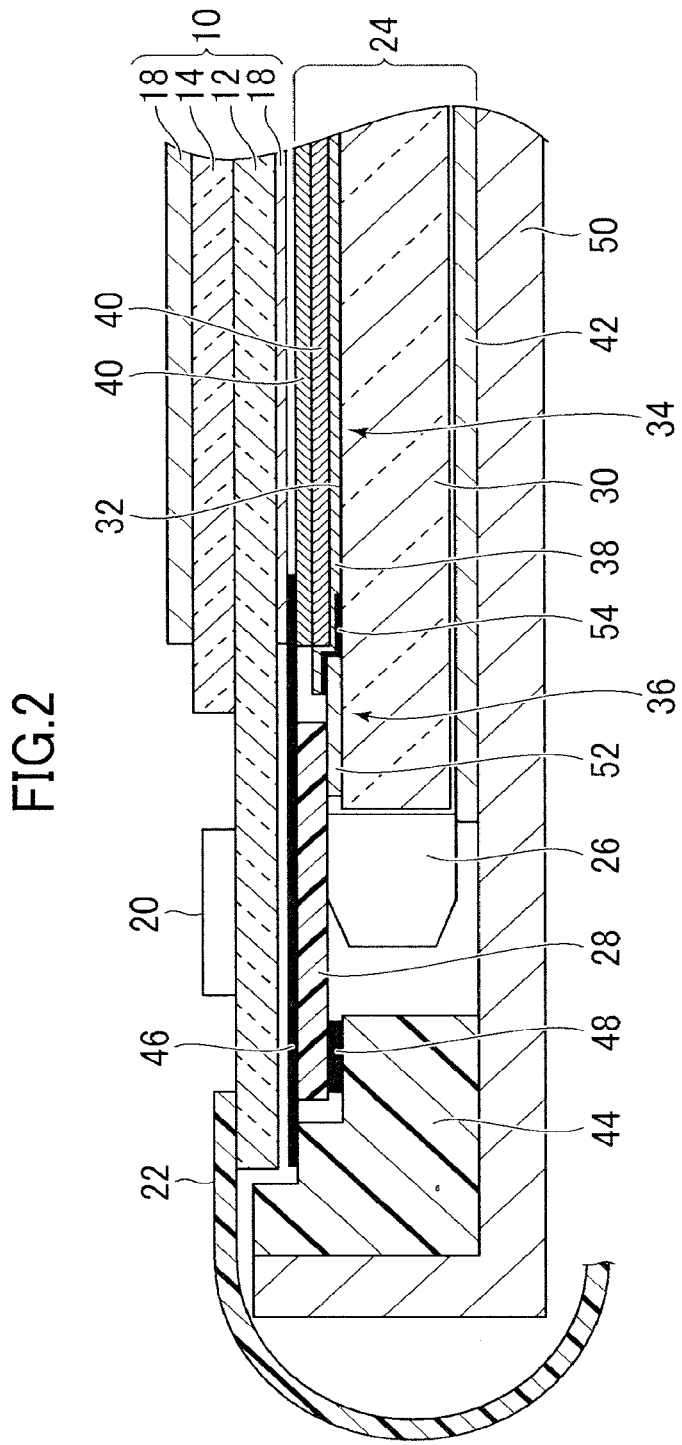
FIG. 2 is a sectional view illustrating a display device according to a first modified example of the embodiment.

FIG. 2 is a sectional view illustrating a display device according to a first modified example of the embodiment. In this example, the light diffusion sheet 38 includes an overlapping portion with the light-shielding pressure-sensitive adhesive sheet 52, and a non-overlapping portion at which the overlapping is avoided. On the light diffusion sheet 38, a light-shielding film 54 is formed so as to cross a boundary between the overlapping portion and the non-overlapping portion. The light-shielding film 54 may be formed by printing and the like. With the light-shielding film 54, it is possible to prevent light leakage from the boundary between the overlapping portion and the non-overlapping portion. Other configurations correspond to the contents described in the above-mentioned embodiment.

Figure 3:
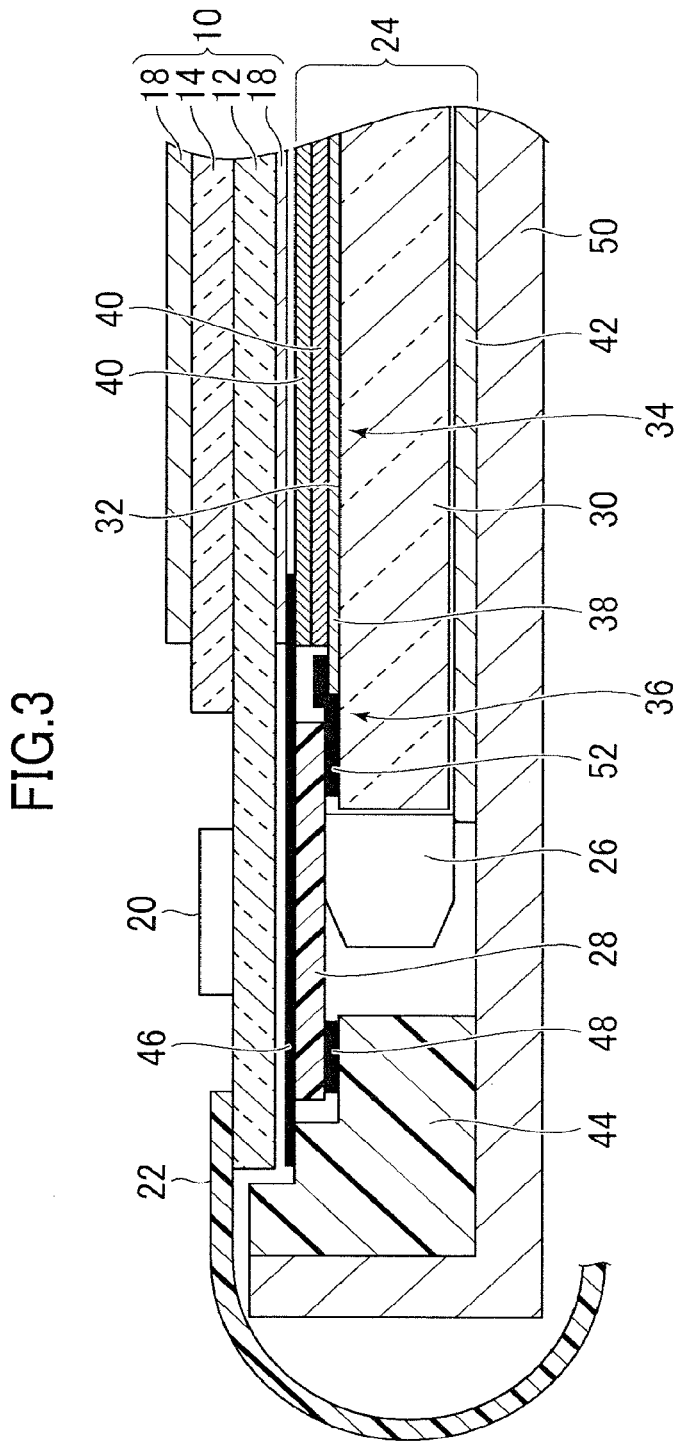
FIG. 3 is a sectional view illustrating a display device according to a second modified example of the embodiment.

FIG. 3 is a sectional view illustrating a display device according to a second modified example of the embodiment. In this example, the positions of the light diffusion sheet 38 and the light-shielding pressure-sensitive adhesive sheet 52 are inverted from those of the example of FIG. 1. That is, the light-shielding pressure-sensitive adhesive sheet 52 overlaps with the light diffusion sheet 38 arranged on the light guide plate 30. Other configurations correspond to the contents described in the above-mentioned embodiment.

Figure 4:
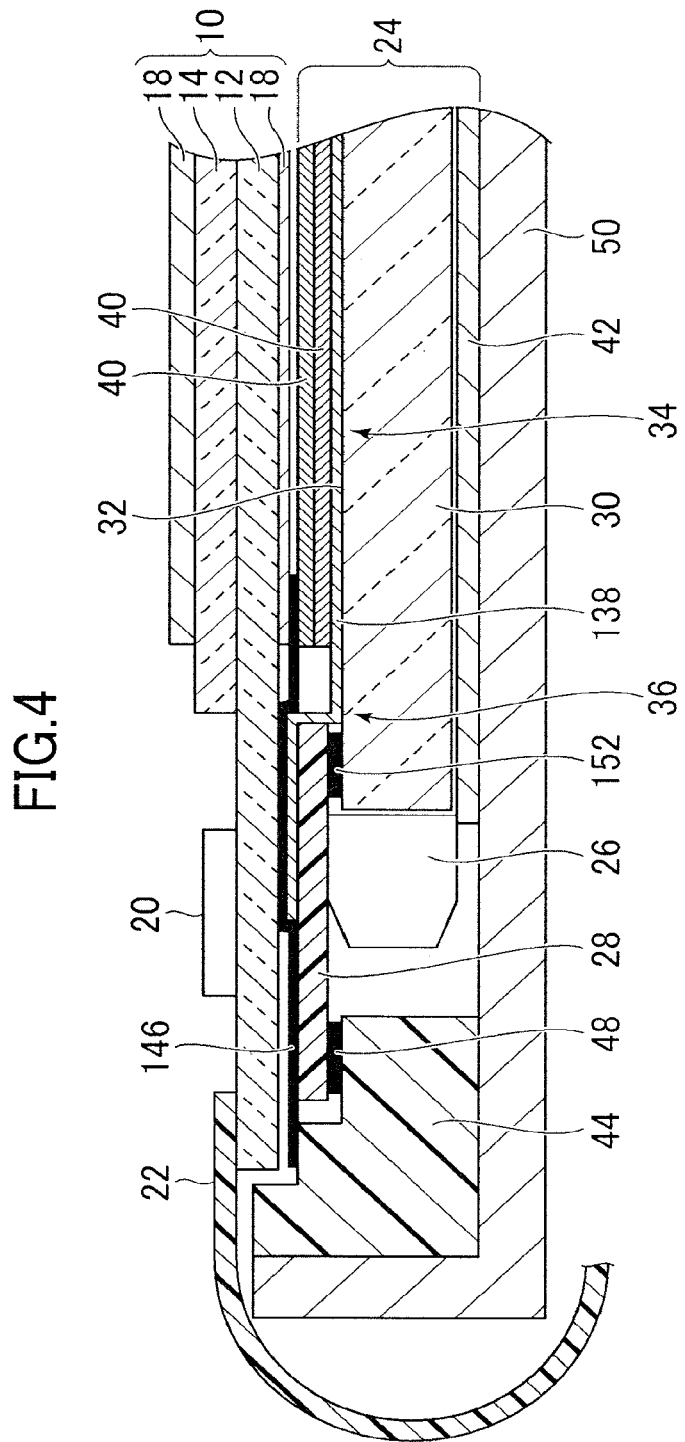
FIG. 4 is a sectional view illustrating a display device according to a third modified example of the embodiment.

FIG. 4 is a sectional view illustrating a display device according to a third modified example of the embodiment. In this example, a light diffusion sheet 138 is arranged so as to reach a surface of the wiring board 28 which is directed to a side opposite to the light guide plate 30. Specifically, the light diffusion sheet 138 extends from the effective region 34 to the light entering region 36 of the light guide plate 30 to run on the wiring board 28.

The light diffusion sheet 138 overlaps with a light-shielding pressure-sensitive adhesive sheet 152 through an intermediation of the wiring board 28. The light-shielding pressure-sensitive adhesive sheet 152 adheres to the wiring board 28 and the light guide plate 30. The light-shielding pressure-sensitive adhesive sheet 152 is arranged only at a position at which the wiring board 28 overlaps with the light guide plate 30, and does not directly adhere to the light diffusion sheet 138.

A double-sided tape 146 which causes the display panel 10 to adhere to the inner frame 44 is positioned on the light diffusion sheet 138 on the wiring board 28. As is understood through comparison to the example of FIG. 1, in the example of FIG. 4, the light diffusion sheet 138 serves as a spacer so that the double-sided tape 146 adheres to the display panel 10 even on the wiring board 28. A surface of the double-sided tape 146 on a side opposite to the display panel 10 adheres to the light diffusion sheet 138. That is, the double-sided tape 146 causes the display panel 10 and the light diffusion sheet 138 to adhere to each other. Other configurations correspond to the contents described in the above-mentioned embodiment.

Figure 5:
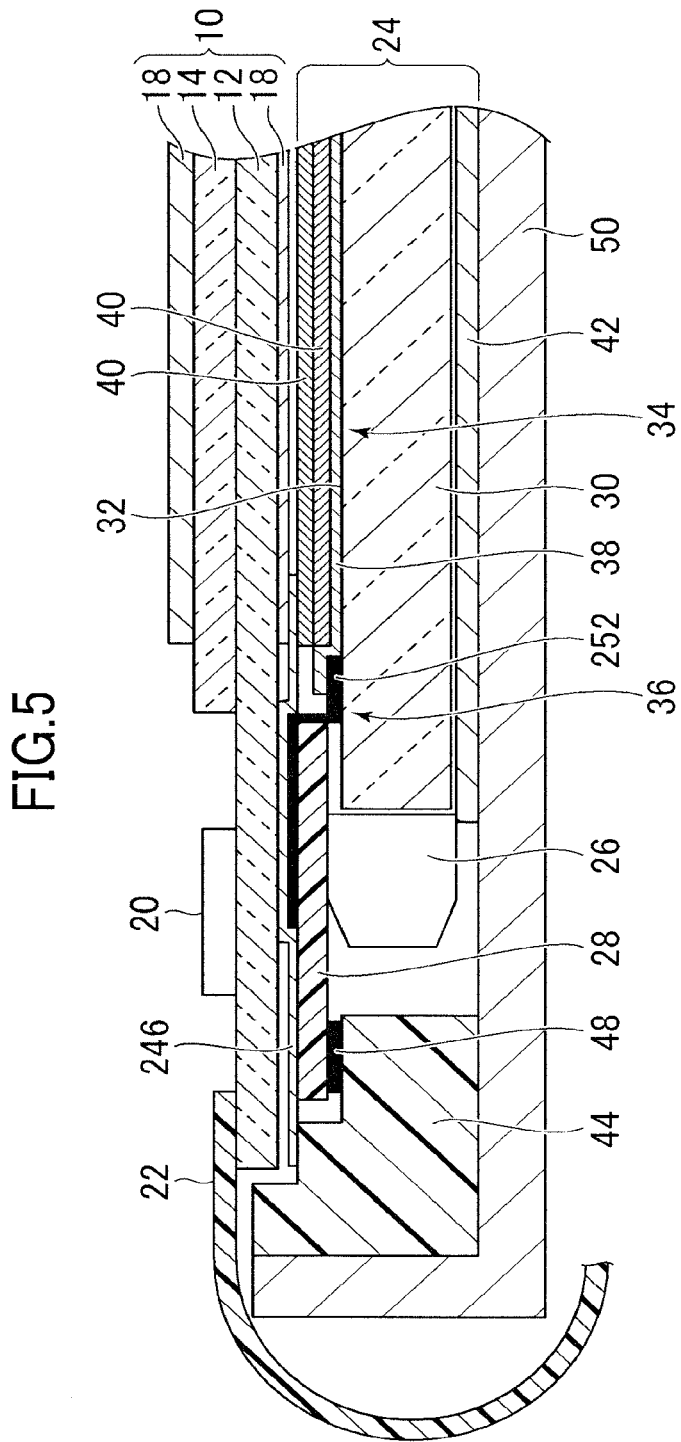
FIG. 5 is a sectional view illustrating a display device according to a fourth modified example of the embodiment.

FIG. 5 is a sectional view illustrating a display device according to a fourth modified example of the embodiment. In this example, a light-shielding pressure-sensitive adhesive sheet 252 adheres from the surface of the wiring board 28 directed to a side opposite to the light guide plate 30 to the front surface 32 of the light guide plate 30. Further, the light-shielding pressure-sensitive adhesive sheet 252 covers the upper side of the light source 26, and hence has an effect of blocking light passing through the wiring board 28.

A double-sided tape 246 which causes the display panel 10 to adhere to the inner frame 44 is positioned on the light-shielding pressure-sensitive adhesive sheet 252 on the wiring board 28. The light-shielding pressure-sensitive adhesive sheet 252 serves as a spacer so that the double-sided tape 246 adheres to the display panel 10. A surface of the double-sided tape 246 on a side opposite to the display panel 10 adheres to the wiring board 28 and the light-shielding pressure-sensitive adhesive sheet 252. Other configurations correspond to the contents described in the above-mentioned embodiment. Note that, for the overlapping of the light-shielding pressure-sensitive adhesive sheet 252 with the light diffusion sheet 38, the light-shielding pressure-sensitive adhesive sheet 252 may be positioned above the light diffusion sheet 38, or the light diffusion sheet 38 may be positioned above the light-shielding pressure-sensitive adhesive sheet 252.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A backlight comprising:
   a light emitting diode;
   a wiring board;
   a light guide plate;
   an optical sheet; and
   a double-sided tape,
   wherein
   the light emitting diode has an emission region and is mounted on the wiring board,
   the light guide plate has a side surface into which light from the light emitting diode enters and a front surface from which the light exits,
   the optical sheet overlaps with the front surface of the light guide plate,
   the double-sided tape adheres to the wiring board,
   the front surface of the light guide plate includes an effective region serving as a planar light source and a light entering region between the side surface and the effective region, and
   the optical sheet overlaps with the double-sided tape in the light entering region.

2. The backlight according to claim 1, wherein the double-sided tape overlaps with the light emitting diode.

3. The backlight according to claim 1, wherein the double-sided tape adheres to the optical sheet.

4. The backlight according to claim 1, wherein the double-sided tape is for adhering to a display panel.

5. The backlight according to claim 1, wherein the double-sided tape has a light shielding layer.

6. A backlight comprising:
- a light emitting diode having an emission region;
- a wiring board having the light emitting diode mounted thereon;
- a light guide plate having a side surface into which light from the light emitting diode enters and a front surface from which the light exits;
- an adhesive tape adhered to the wiring board; and
- an optical sheet disposed above the front surface of the light guide plate,
- wherein the front surface of the light guide plate comprises an effective region for outputting the light from the light emitting diode and a light entering region provided between the effective region and the side surface,
- wherein the optical sheet extends from the effective region to the light entering region and overlaps with the adhesive tape in the light entering region.

7. The backlight according to claim 6, wherein the adhesive tape overlaps with the light emitting diode.

8. The backlight according to claim 6, wherein the adhesive tape adheres to the optical sheet.

9. The backlight according to claim 6, wherein the adhesive tape is for adhering to a display panel.

10. The backlight according to claim 6, wherein the adhesive tape has a light-shielding layer.

\* \* \* \* \*